United States Patent [19]

Howells et al.

[11] Patent Number: 5,008,871
[45] Date of Patent: Apr. 16, 1991

[54] DICTATE/TRANSCRIBE CONTROL FOR DIGITAL DICTATION SYSTEM

[76] Inventors: Joseph A. Howells, 10 Old Woods Rd., Brookfield Center, Conn. 06804; Emil F. Jachmann, 34 Harborview Pl., Stratford, Conn. 06497; Robert L. Rubenstein, 46 Mohawk Dr., Norwalk, Conn. 06855

[21] Appl. No.: 289,555

[22] Filed: Dec. 22, 1988

[51] Int. Cl.⁵ .......................................... G11B 27/031
[52] U.S. Cl. ...................................... 369/28; 369/27; 369/25; 379/75
[58] Field of Search .................. 379/75; 369/25-29; 360/13

[56] References Cited
U.S. PATENT DOCUMENTS

| 4,260,854 | 4/1981 | Kolodny et al. | 369/29 X |
| 4,468,751 | 8/1984 | Plunkett, Jr. | 369/29 X |
| 4,908,866 | 3/1990 | Goldwasser et al. | 369/25 X |

Primary Examiner—David Trafton
Assistant Examiner—James E. Tomassini
Attorney, Agent, or Firm—Robert H. Whisker; Melvin J. Scolnick; David E. Pitchenik

[57] ABSTRACT

A digital dictation system having plural ports through which dictate and transcribe stations may be connected to a central store via respective dictate and transcribe channels for recording and transcribing messages. The transcribe port may be selectively conditioned, as by operating a manual selector, for enabling a dictate station to be connected therethrough to carry out dictate operations with the central store. Upon release of the port by the dictate station, the port reverts to its normal transcribe condition. By providing at least two ports, separate dictate and transcribe operations may be carried out concurrently on the same message. A dictator may review and edit a portion of the message which has already been transcribed by the transciptionist, whereupon the system automatically conditions the transcribe apparatus to play back the edit.

14 Claims, 4 Drawing Sheets

DICTATE/TRANSCRIBE CONTROL FOR DIGITAL DICTATION SYSTEM

BACKGROUND OF THE INVENTION

This invention relates to audio recording/reproducing apparatus and, more particularly, to a digital dictation system permitting simultaneous dictation and transcription of the same message from a central store and, furthermore, to permit the store to be accessed by way of a port which normally enables transcribe operations to be carried out but which may be conditioned for operation as a dictate port.

In typical prior art dictation systems, audio information is recorded on a magnetic medium, typically magnetic tape. Typical of such dictation equipment are analog recorders wherein the audio information is recorded in analog form. Customarily, analog dictation systems have been classified as stand alone units, also known as desk-top or portable recorders in which the magnetic tape is housed in a replaceable tape cassette, central systems wherein one or more bins of endless tape are accessible to several dictators and to several transcriptionists, whereby multiple dictate and transcribe operations may be performed simultaneously, central systems wherein individual tape decks are used in place of the aforementioned tape bins, and so-called small work group systems which combine the advantages of both central and stand alone dictation systems. Each of the aforementioned types of equipment has been made available by Dictaphone Corporation, the assignee of the present invention, and descriptions of typical apparatus are found in the following patent literature:

Stand alone machines are described in U.S. Pat. Nos. 4,378,577 and 4,410,923.

Central systems using endless magnetic tape as the recording medium are described in U.S. Pat. Nos. 3,817,436 and 3,984,644.

Central systems using replaceable tape cassettes are described in U.S. Pat. Nos. 4,092,679 and 4,636,888.

Small work group systems are described in U.S. Ser. No. 145,228, filed Jan. 19, 1988 and U.S. Ser. No. 799,909, filed Nov. 20, 1985.

Recently, digital recording techniques have been proposed for use in dictation equipment. Although digital controls have long been used in controlling and monitoring dictation and transcription operations, such as described in U.S. Pat. Nos. 4,319,337 and 4,623,988, the audio information recorded in such digitally controlled equipment nevertheless has been recorded in analog form. However, with the recent development of low cost, high capacity digital storage equipment, such as high capacity floppy disks and, more advantageously, high capacity hard disk storage systems (also known as Winchester disk drives, rigid disk drives, disk packs, etc.), the opportunity to economically record audio information in digital form has been made available.

In digital dictation equipment, input analog audio signals are sampled and each analog sample is converted to a digital audio sample. Bytes representing the digital audio samples are recorded on a magnetic disk, either a floppy disk or a Winchester disk, in much the same way as any other digital information is magnetically stored (or "written"). During playback (or "reading"), each byte is read from the magnetic disk and converted to an analog sample. Successive samples result in a restoration of the original analog audio signal. The high speeds at which digital signals are processed, recorded, read and manipulated when compared to the relatively low frequencies of typical speech signals, permit a relatively inexpensive digital storage device to be used as the primary store of a central dictation system. By using a single (or relatively few) high capacity Winchester disk drive, several dictators and several transcriptionists may access the central store to record and transcribe messages. Also, digit al recording techniques permit quick access, on the order of milliseconds, to virtually any message that has been recorded, thereby facilitating quick review, recovery and editing of respective messages. Indeed, contrary to typical analog dictation systems, a digital system permits a dictator to edit a message in such a way that, during subsequent transcription of that edited message, the transcriptionist need not even be aware of the fact that editing has been achieved. This contrasts with conventional analog dictation systems wherein editing typically is achieved by recording special instructions to direct a transcriptionist to other parts of the magnetic tape on which inserts or other changes are recorded.

Central dictation systems permit a transcriptionist to begin transcription of a message, such as a letter, even while the dictator continues to record the remainder of that letter. Digital dictation equipment facilitates such simultaneous dictate/transcribe operations; and since magnetic tape is not used as the record medium, there is no physical constraint to prevent the transcriptionist from transcribing information which has been recorded by the dictator only milliseconds before. Hence, by eliminating separate dictate and transcribe heads separated by a finite distance, as was required in central dictation systems employing magnetic tape, there is no physical impediment to keep the transcriptionist from transcribing "right on the heels" of the dictator. Indeed, by using digital dictation equipment, it is possible for the dictator to review that portion of his message which has already been transcribed.

Heretofore, the fact that a dictator could not access any portion of a message which had been transcribed prevented the dictator from reviewing that message, modifying it and improving it as he may desire. Such ability now is present in digital dictation equipment. However, a problem may arise if the dictator revises a previously transcribed message without apprising the transcriptionist of such revisions.

Although central dictation systems, both of the analog magnetic tape type and the digital type, accommodate several dictators and transcriptionists, there is a physical limitation based simply on the number of physical connections that may be made at one time to the system. In a digital dictation system, such connections are made through "ports"; and it is common to provide a number of dictate ports as well as a number of transcribe ports. Since a transcriptionist may gain access to any message that has been recorded in the digital dictation system, it often suffices to provide far fewer transcribe ports than dictate ports.

At times, a central dictation system may be subject to heavy usage, or dictation traffic. As a result, a greater number of dictators may desire access to the system than may be accommodated. By providing one or more dedicated transcribe ports, dictators have been resigned to awaiting the availability of a dictate port before system access, or seizure, may begin.

OBJECTS OF THE INVENTION

Therefore, it is an object of the present invention to provide improved digital dictation equipment which avoids the aforenoted drawbacks, disadvantages and problems associated with prior art central dictation systems.

Another object of this invention is to provide a digital dictation system which permits simultaneous dictate and transcribe operations to be carried out on the same message.

A further object of this invention is to provide a digital dictation system of the aforementioned type in which a dictator may edit that portion of a message which has already been transcribed and which conditions the transcriptionist to effect immediate transcription of such edits.

An additional object of this invention is to provide a digital dictation system having several ports through which dictate and transcribe stations may gain access to the system; and which permits a transcribe port to be used, at least temporarily, as a dictate port.

Various other objects, advantages and features of the present invention will become readily apparent from the ensuing detailed description, and the novel features will be particularly pointed out in the appended claims.

SUMMARY OF THE INVENTION

In accordance with this invention, a digital dictation system is provided with a central store that is accessible concurrently by at least one dictator and one transcriptionist. The dictator may review a message then being transcribed by the transcriptionist and, if desired, the dictator may record information, such as edit changes, in the message then being transcribed. A transcribe playback control is conditioned automatically to play back to the transcriptionist at least the edit in the message recorded by the dictator if that edit is made at a portion of the message which has already been transcribed.

As one aspect of this invention, a position detector detects when the dictator position precedes the transcriptionist position in the message then being transcribed; and a record sensor senses when the dictator records an edit in the message then being transcribed; whereupon the transcribe playback control is conditioned to enable the transcriptionist to play back automatically at least the edit.

As another aspect of this invention, a dictate pointer represents the present position of the dictator in the central store, and a transcribe pointer represents the present position of the transcriptionist in that store. The relative pointer positions are detected to determine when the dictate pointer precedes the transcribe pointer, thereby conditioning the transcribe playback control to play back messages from those locations in the store corresponding to the dictate position if the dictator initiates a recording operation. That is, the transcribe pointer is changed automatically to be no greater, and preferably less, than the dictate pointer. Advantageously, a warning indication is provided to the transcriptionist when the transcribe pointer is changed to be equal to or less than the dictate pointer.

As another feature of this invention, the digital dictation system is provided with several ports, at least one of which is a dictate port through which dictation operations are carried out and one is a transcribe port through which transcribe operations normally are carried out. A manually operable selector conditions the transcribe port either to carry out its normal transcribe operations or to carry out dictate operations and, thus, permits the transcribe port to be connected to a dictate station which, in turn, may seize the digital dictation system by way of this conditioned transcribe port.

As an aspect of this feature, when the dictate station releases the conditioned transcribe port, that port reverts to its normal transcribe-enabling condition to carry out transcribe operations thereafter.

As yet another aspect of this feature, the selector may be operated to condition the transcribe port as a quasi-permanent dictate port to respond to several seizures thereof by dictate stations and thereby carry out dictate operations. That is, the thus-conditioned transcribe port does not revert to its normal transcribe-enabling condition when the port is released. Such reversion may be effected, however, simply by operating the manual selector.

BRIEF DESCRIPTION OF THE DRAWINGS

The following detailed detailed description, given by way of example, will best be understood in conjunction with the accompanying drawings in which.

DETAILED DESCRIPTION OF A PREFERRED EMBODIMENT

The invention disclosed herein is described in the environment of dictation/transcription equipment, and particularly in the environment of such equipment wherein plural dictation operations may be carried out concurrently with a transcription operation. However, it will be fully appreciated that this invention admits of more general application in the sound recording arts and need not the limited solely to such dictation/transcription equipment.

Dictate/Transcribe System

Figure 1:
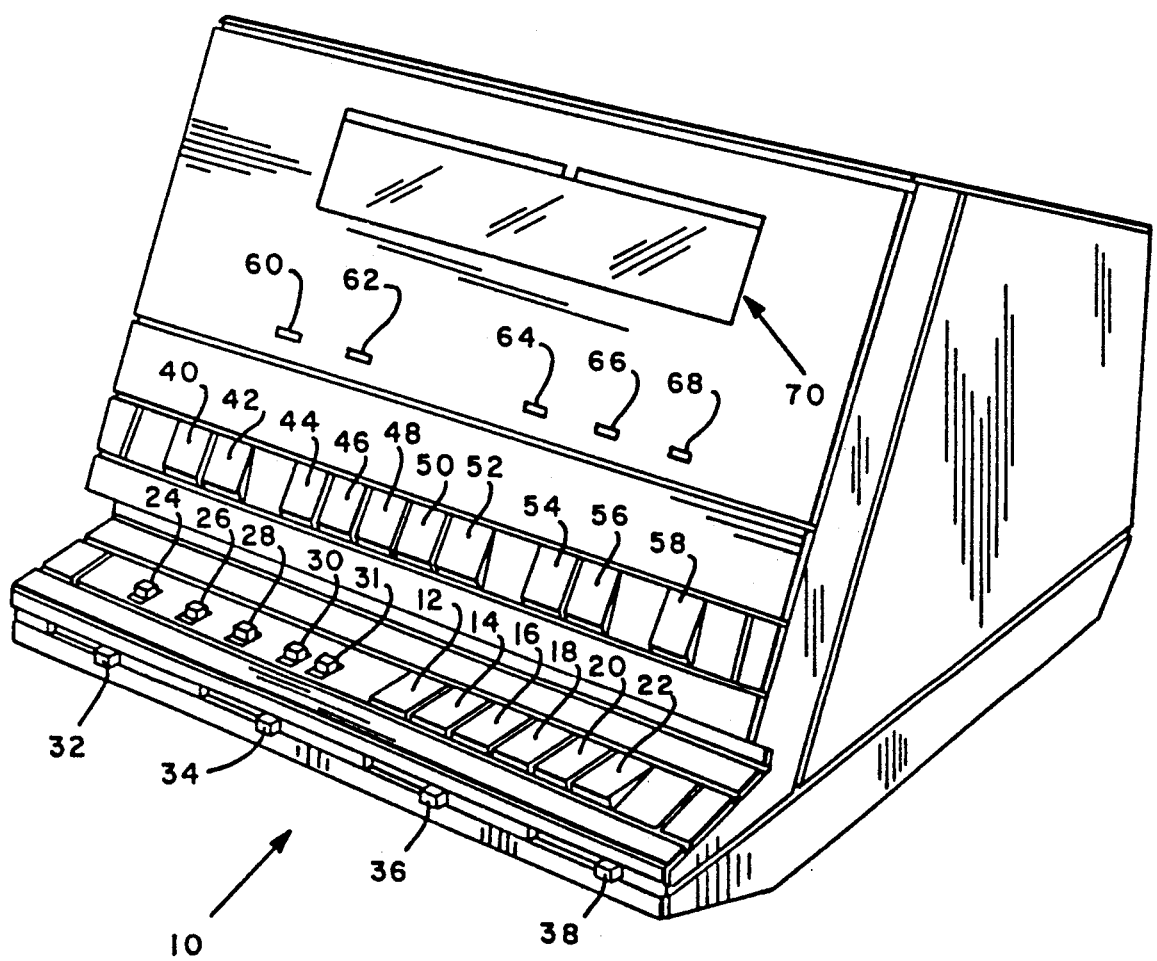
FIG. 1 is a perspective view of a preferred embodiment of recording and reproducing apparatus which incorporates the present invention.

Turning now to FIG. 1, there is illustrated a perspective view of dictation/transcription equipment 10 in which the present invention is used. This equipment is referred to herein as a recording/reproducing system and it will be appreciated that various peripheral devices, such as dictate stations may be easily connected to system 10. In the interest of simplification and brevity, such peripheral devices are not shown. Examples of suitable dictate and transcribe stations are described in U.S. Ser. Nos. 495,756, 145,228 and 799,909. System 10 includes a suitable microprocessor, such as Model MPD 70208, manufactured by NEC, for controlling the communication of information and function control signals between the system and the dictate and transcribe terminals connected thereto. In addition, data concerning the length of each dictated message, referred to herein as a "job", the source of that message, the time at which it was dictated, the identity of the transcriptionist selected to transcribe it, the time at which transcription was completed and other, similar information are generated, monitored and displayed by the microprocessor. It will be appreciated that such job related information is useful for management purposes, such as determining backlog, efficiency, etc. in a dictate/transcribe operation.

The manner in which the microprocessor operates to monitor dictation/transcription traffic through system 10, and the manner in which the aforementioned management information is generated and used, forms no part of the present invention per se. Nevertheless, to provide an understanding of the overall operation of system 10, the following control functions are described:

System 10 is provided with various manually operable pushbutton selector switches 12–58 which are used in conjunction with dictation and transcription as follows: Button 12 operates as a STOP switch which, when actuated, terminates whatever transcription function then is in process. In the preferred embodiment of system 10, input audio signals received from a dictate station are converted to digital form and these digital audio signals are stored, preferably on a magnetic medium. Although floppy disk media may be used to record such digital audio signals, the use of a Winchester disk drive is contemplated. A so-called "pointer" is generated and used to identify the locations in the storage medium, that is, on the disk medium, at which the digital audio signals are recorded. As dictation proceeds, this pointer advances. If a dictator reviews those audio signals which he had recorded, the pointer is reversed. Thus, it will be appreciated that this pointer functions in much the same way as a magnetic tape to the extent that both the tape and pointer are advanced during recording or reproducing operations, both the tape and pointer are reversed to effect a "rewind" operation, and both the tape and pointer are advanced at a relatively rapid rate to effect a "fast forward" operation.

Similarly, a pointer is generated and used to identify the locations on the disk medium from which the digital audio signals are played back, or transcribed. Here too, this transcribe pointer advances and reverses while play, fast forward and review operations are selected by the transcriptionist. It is appreciated that the transcribe pointer is "stopped" in much the same way as a magnetic tape is stopped in response to the actuation of STOP button 12.

A REVIEW button 14 is provided to reverse the pointer, as aforementioned, in a manner similar to a magnetic tape rewind operation. Hence, actuation of the REVIEW switch emulates the rewind movement in a conventional analog dictation system.

A FAST FORWARD button 16 is provided to effect rapid advance of the aforementioned pointer in a manner similar to the fast forward movement of a conventional analog dictation system. In one embodiment, the "rate" at the pointer is advanced increases with the length of time that FAST FORWARD switch 16 remains actuated. Preferably, if the pointer had been reversed from the farthest advance "position" attained thereby, the "fast forward" advance of the pointer terminates once the pointer returns to its farthest advance "position".

Pushbutton switch 18 functions as a BORDER switch which, when actuated, positions the pointer almost instantly at the beginning of the message then being dictated or transcribed. If switch 18 is actuated a second time, the pointer is moved practically instantly to the end of that message. Thus, the user may access the beginning or end of a message without waiting for the simulated "rewind" or "fast forward" operation. This feature is particularly helpful to a transcriptionist.

A PLAY pushbutton switch 20 is provided to initiate the playing back of recorded audio signals When a transcriptionist accesses a particular job that had been recorded, the actuation of PLAY switch 20 begins the playback operation of that job. Of course, it is expected that a transcriptionist or dictator, or a supervisor, also will operate the PLAY switch to resume the interrupted play back of a recorded message.

Pushbutton switch 22 operates as a RESUME switch which, when actuated, moves the aforementioned pointer to the farthest advance position which had been attained in the message which then is being transcribed. For example, if the transcriptionist wishes to review a mid-portion of a job, once that portion has been verified, the transcriptionist may return to the farthest advance point at which she had left off merely by actuating RESUME switch 22.

A selector switch 24 is provided to enable the user of system 10 to listen to reproduced audio information either by way of the built-in speaker (not shown) included in the system or by way of a headset (also not shown) which may be connected to the system.

Selector switch 26 is adapted to enable system 10 to be connected to a transcribe station either by way of a "hard wire" connection, also known as a "private line" connection, or by way of a telephone connection. Thus, the transcribe station may be connected directly to system 10 via private lines or via a conventional telephone network. An example of such local/remote connection of a transcribe station to an audio signal playback device is described in U.S. Ser. No. 495,756.

In one embodiment of system 10, two dictate stations and one transcribe station are adapted to be connected to respective ports of the system. The transcribe port, that is, the port to which the transcribe station is connected, is adapted to exhibit three different operating modes, any one of which may be selected by selector switch 28. A so-called "normal" mode connects the transcribe station through the transcribe port to carry out a typical transcribe operation. A re-record mode may be selected to enable audio signals recorded in system 10 to be played back through the transcribe port and re-recorded on another medium. Stated otherwise, previously dictated jobs may be "downloaded" through the transcribe port onto, for example, a tape cassette, whereby that job may be transcribed on a separate stand-alone transcribe machine. Finally, a so-called "off-line" mode may be selected, whereby the transcribe port is rendered out of service. In this mode, previously recorded jobs cannot be transcribed or re-recorded through the transcribe port.

A two-position selector switch 30 is provided and exhibits a "normal" position which enables dictation and transcription to occur. In its other position, switch 30 enables the user to enter into a suitable storage table the identification of those individuals who are expected to record and/or transcribe messages on system 10. In this so-called "entry" position of switch 30, the identification, such as ID numbers of dictators (or "authors")

may be entered. During subsequent dictation operations, a dictator whose identification has been entered into system 10 thus may be identified as the author of a dictated job. This facilitates management over the dictation operation, such as by enabling those jobs recorded by a particular dictator to be recovered, processed, or monitored.

A three-position selector switch 31 is adapted to permit an operator to vary the type of operation that may be carried out via the transcribe port. In one position, referred to as the "transcribe" position, the transcribe port is conditioned to effect typical transcribe operations. For example, when conditioned for a transcribe operation, previously recorded digital audio signals may be played back and reproduced via a headset or loudspeaker under the control of a foot pedal switch. In another position, referred to as the dictate once" position, the transcribe port is conditioned to effect a "one time" dictate operation, whereby a dictator may record one or more messages on the disk medium by way of a connection between the dictator's dictate station and the transcribe port. Typical dictate functions are carried out; but once seizure of the transcribe port by the dictate station ends, for example, once the dictator hangs up, the transcribe port reverts to its aforementioned transcribe condition and now may be used for transcribe operations. Finally, in the third position of switch 31, referred to as the "continual dictate" position, the transcribe port is conditioned for continuous dictate operations (as opposed to the aforedescribed "dictate once" operation). A dictate station may seize the transcribe port to carry out a typical dictate operation, and the transcribe port remains in its dictate condition even after the dictator hangs up, thus permitting further seizures of the transcribe port for still additional dictate operations by the same or different dictators.

A volume control 32, such as in the form of a slide control, is provided to increase or decrease the audio volume of a message played back from system 10. Similarly, a tone control 34, also constructed as a slide control, permits the user to adjust the treble/bass balance of the reproduced audio signal.

A speed control 36 is provided as a slide control and is adapted, when adjusted, to enable the transcriptionist to vary the speed at which reproduced signals are played back. Thus, if the transcriptionist is not comfortable with the normal speech pattern of a dictator, speed control 36 may be adjusted to modify at least the speed of that pattern. As one example of speed control, pauses in the reproduced audio signals are compressed or expanded to vary the speed of the played back speech pattern. An automatic backspace control 38, which also is constructed as a slide control, is adapted to establish the amount of backspacing automatically achieved when a transcriptionist momentarily interrupts the playback operation. For example, upon release of a suitable switch, such as a foot pedal or the like, during a transcribe operation, the aforementioned pointer returns to a previous location. The magnitude of this return is the "backspace" and it may be adjusted by manually adjusting control 38. In the preferred embodiment, this backspace control is adjustable over a range from zero to ten seconds.

System 10 is provided with a display window 70 adapted to display various text messages relating to the jobs which have been dictated and/or transcribed in system 10. In the preferred embodiment, display window 70 is comprised of a multi-line dot matrix LCD display. Typical of the information displayed are: current date and time, total number of untranscribed jobs recorded on system 10, total dictation time of those untranscribed jobs, the number of jobs of a selected type (e.g. the number of letters or the number of memos or the number of reports, etc.) that have not been transcribed, and the number of jobs dictated by a particular author which remain untranscribed. Display window 70 also provides information relating to the job which has been selected by the transcriptionist for transcription. Information relating to this selected, or current job, includes the identification of the author and type of that job, the date the job was commenced, the time at which dictation of the job was completed, the overall length of that job, and the time remaining from the present transcribe pointer position to the end of that job.

Pushbuttons 40-58 are used to select and control some of the information displayed by display window 70. A set pushbutton 40 and a select pushbutton 42 are used to set the current date and time displayed by display window 70. A work type pushbutton 46 is adapted, when actuated, to select a desired one of several predetermined (or pre-programmed) work types, or categories of jobs which may be recorded on system 10. By actuating pushbutton 46, the work type display is scrolled, thus enabling the user to select a particular type of job for transcription or for display.

An author pushbutton switch 48 is adapted, when actuated, to enable the user to scroll through those identifications which have been entered into system 10, as was described above in conjunction with the operation of switch 30 to its "entry" position. The user thus may observe those authors authorized for access to system 10. By operating switch 30, the user may select a desired author whose jobs are to be transcribed; or the user may at least be apprised of those jobs which this author has dictated.

Pushbutton switches 50 and 52 are adapted, when actuated, to scroll the display in window 70 in the reverse or forward directions, respectively, thereby accessing a particular letter. The user thus may select a job for transcription, as by actuating either of these pushbuttons, or at least may observe information relating to that job, as displayed on display window 70. Upon actuating pushbutton switch 52, the aforementioned pointer returns to the beginning of the next preceding untranscribed job recorded in system 10. Similarly, upon actuating pushbutton switch 52, the aforementioned pointer advances to the beginning of the next-following untranscribed job. It will be appreciated that a transcribed job may be distinguished from an untranscribed job simply by the setting or resetting of a suitable flag associated with job identification information. For example, a table of recorded jobs, both transcribed and untranscribed, may be provided; and this table may include information identifying each such job, including the aforementioned flag.

Pushbutton switches 54, 56 and 58 are adapted to erase job-related information from the aforementioned table once that job has been transcribed. This table may be characterized as a job status file, and pushbutton switch 58 may function as an "erase" switch. When switch 58 is actuated concurrently with pushbutton switch 54, job-related information associated with the job which has just been transcribed is erased from the status file If ERASE button 58 is actuated concurrently with pushbutton switch 56, job-related information associated with all jobs which had been transcribed are erased from the status file It is appreciated that, in the preferred embodiment wherein audio information is recorded in digital form, the erasure of job-related information from the status file is tantamount to erasing the digital audio signals from the system. Thus, one or more jobs may be erased practically instantly upon actuation of pushbutton switches 54, 56 and 58.

Pushbutton switch 44 is adapted, when actuated, to initiate a re-record operation. It is appreciated that, to transfer audio signals which had been recorded in system 10 to another medium externally of that system, switch 28 should be located at its aforementioned re-record position. Assuming this positioning of switch 28, the actuation of pushbutton switch 44 commences the re-record operation.

System 10 also is provided with visual indicators 60–68 which, for example, may be formed as LED devices. Indicator 60 is adapted to provide an indication when approximately 90% of the recording capacity of system 10 has been consumed. Indicator 60 thus is analogous to a conventional "end zone" indication normally provided in conventional analog dictation equipment. It is appreciated that the recording capacity of system 10 increases as jobs are erased therefrom.

Indicator 62 is adapted to provide a suitable indication in the event of any abnormal condition which may be sensed. For example, if the recording capacity of system 10 has been reached or if a malfunction occurs, indicator 62 is actuated. Also, it is contemplated that this indicator is energized to apprise an operator that system 10 has been placed in its "off-line" mode, as by operating switch 28 to its aforementioned off-line position.

Indicators 64 and 66 are adapted to provide indications when the aforementioned dictate ports have been seized to permit a dictate operation. Similarly, indicator 68 is adapted to provide an indication that the transcribe port has been seized. Stated otherwise, indicators 64–68 provide so-called "in use" indications of the respective dictate and transcribe ports.

Figure 2:
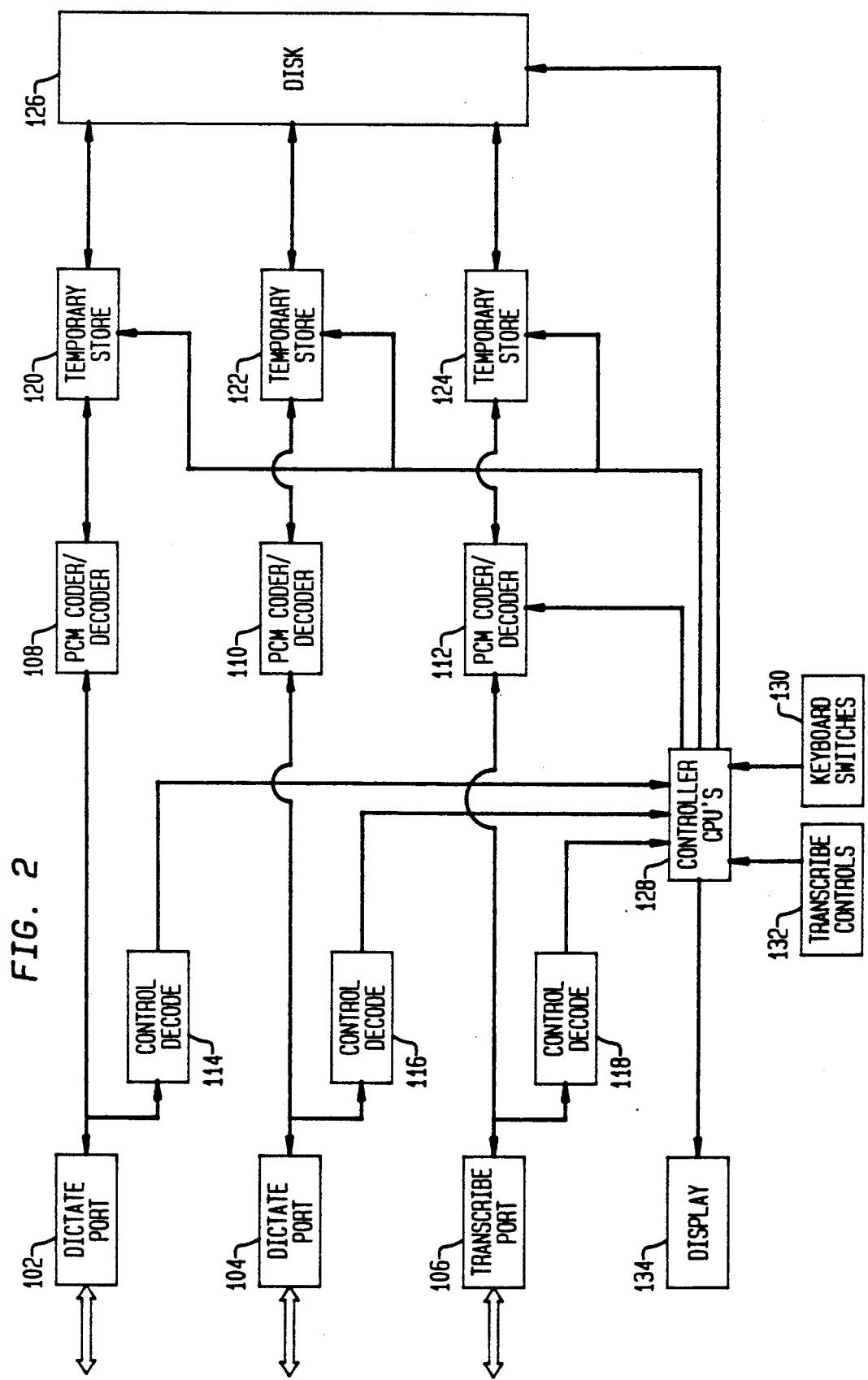
FIG. 2 is a block diagram of the manner in which the recording and reproducing apparatus communicates with dictate and transcribe stations.

Turning now to FIG. 2, there is illustrated a block diagram of the manner in which dictate and transcribe operations are carried out to record and play back messages on disk medium 126 in system 10. As one example, it is assumed herein that system 10 is provided with three ports, each adapted to be connected to a dictate or transcribe station (to be described) and each adapted to permit dictate or transcribe operations to be carried out therethrough. Those of ordinary skill in the art will understand what is meant by a "port" and further description is not provided. FIG. 2 illustrates two dictate ports 102 and 104 and one transcribe port 106. It is anticipated that each of the dictate ports is connected, either directly or by a switching matrix to a dictate station of the aforementioned type. Likewise, it is anticipated that transcribe port 106 is connected, either directly or via a switching matrix, to a transcribe station. Alternatively, each dictate port and the transcribe port may be connected to a dictate or transcribe station by way of a telephone communications connection. In any event, it is expected that both control signals and audio signals communicate between system 10 and the dictate and transcribe stations connected to the respective ports. The control signals are of the type which control so-called "play", "fast-forward", "rewind" and "record" functions. Additional functions also are selected and initiated by the control signals supplied to the ports; but such additional control signals form no part of the present invention per se and, therefore, further description thereof is not provided.

Each port is coupled to a channel comprised of a PCM coder/decoder, a control signal decoder and a temporary store. Thus, dictate port 102 is coupled to a dictate channel, and particularly to PCM coder/decoder 108 and also to control decoder 114 The PCM coder/decoder additionally is coupled to temporary store 120 which, in turn, communicates with disk medium 126. In a similar manner, dictate port 104 is coupled to PCM coder/decoder 110 and to control decoder 116 of another dictate channel. Temporary store 122 is coupled to the PCM coder/decoder and also to disk medium 126. Finally, transcribe port 106 is coupled to PCM coder/decoder 112 and to control decoder 118 of a transcribe channel. The PCM coder/decoder also is coupled to temporary store 124 which, in turn, communicates with disk medium 126.

A central controller 128, referred to herein as central processing control units (CPU's), may be formed of one or more microprocessors and is adapted to respond to control signals supplied to the respective control signal decoders from the dictate and transcribe ports for controlling read and write operations of the temporary stores and of the disk medium. As schematically represented, the outputs of control signal decoders 114, 116 and 118 are coupled to controller 128. The controller includes outputs coupled to PCM coder/decoder 112, to temporary stores 120, 122 and 124 and to disk medium 126. Although additional outputs may be coupled from the controller to the remaining PCM coder/decoders, for the purpose of the present discussion, PCM coder/decoder 112 is controlled in a manner which differs somewhat from the manner in which PCM coder/decoders 108 and 110 are controlled. In particular, PCM coder/decoder 112 may operate, in a first mode, simply to receive PCM signals from temporary store 124 and to convert those PCM signals to analog signals which are supplied to transcribe port 106 to be outputted to a transcribe station connected thereto. In another mode, PCM coder/decoder 112 may be operated in a manner substantially identical to the manner in which PCM coder/decoders 108 and 110 operate—namely, to receive analog audio signal from transcribe port 106, convert those audio signals to PCM-encoded audio signals and to output the PCM signals to temporary store 124. Additionally, PCM coder/decoder 112 operates to receive PCM signals from temporary store 124 and to convert those PCM signals to analog audio signals to be outputted to transcribe port 106. Thus, in one mode of operation, only the decoding function of PCM coder/decoder 112 functions to read PCM signals from temporary store 124 and to supply transcribe port 106 with analog-converted representations of those PCM signals for transcription. However, in its other mode of operation, both the encoding and decoding functions of PCM coder/decoder 112 function to convert analog audio signals received from transcribe port 106 into PCM-encoded signals and to write those PCM signals into temporary store 124. This coding function is used during dictation to permit PCM signals to be recorded on disk medium 126. The decoding function of the PCM coder/decoder functions to decode PCM signals read from temporary store 124, thereby playing back audio information which had been recorded on disk medium 126, as is normally performed when a dictator wishes to review information that he has recorded.

Controller 128 also is coupled to keyboard switches 130, such as those described above in conjunction with FIG. 1, and responds to the operation of those keyboard switches to effect the operations discussed above. For the purpose of the present description, it will be noted that controller 128 responds to the particular position of aforedescribed three-position selector switch 31 to determine the operating mode of PCM coder/decoder 112 and, thus, the operating condition of transcribe port 106 and the transcribe channel.

The controller also is coupled to transcribe controls 132 which, in one example, may constitute a foot pedal switch electrically connected to system 10. The transcribe controls also may be thought of as including selected ones of the keyboard switches discussed above and used in carrying out the aforementioned transcribe operations.

As also shown in FIG. 2, controller 128 is coupled to displays 134 which constitute the display circuitry provided in system 10 to drive display window 70 with the aforementioned text messages Thus, display information associated with messages recorded on disk medium 126 are derived by controller 128 to drive displays 134 with suitable text messages of the type discussed above.

An overall, simplified description of the operation of the block diagram shown in FIG. 2 now follows. It is appreciated that dictate ports 102 and 104 may be seized by dictate stations connected thereto and, once seized, enable conventional dictate functions to be carried out. Thus, audio signals are supplied from the dictate station to the seized dictate port, are converted to PCM signals by, for example, PCM coder/decoder 108 and are stored in temporary store 120. As an example, the temporary store has a storage capacity sufficient to store approximately two seconds' worth of dictated PCM signals and serves to buffer those signals for disk medium read/write operations known to those of ordinary skill in the art. The buffered PCM signals are recorded as digital signals on disk medium 126 under the control of a conventional disk controller (not shown); and such digital signals are processed, manipulated and handled in much the same way as any other type of digital information recorded on a disk medium. Control signal decoder 114 responds to control signals supplied from the dictate station through dictate port 102 to apply decoded control signals to controller 128. As one example, the control signals may be supplied as encoded tone signals which are easily detected and decoded. Advantageously, these tone signals, if superimposed onto the audio signal conductors extending from the dictate port, are of predetermined frequencies so as to be distinguished from the audio signals and are not encoded by PCM coder/decoder 108.

Depending upon the control signals which are decoded by control signal decoder 114, controller 128 controls the writing of PCM-encoded audio signals into temporary store 120 and onto disk medium 126 so as to effect a dictate-record operation. The controller serves to generate a dictate pointer which represents the present location on the disk medium at which the digitized audio signals are being recorded As dictation continues, this dictate pointer is incremented, or advanced, which is analogous to a conventional dictation medium being "advanced".

In response to the detection by control signal decoder 114 of a control signal representing fast-forward movement, controller 128 "advances" the dictate pointer at a relatively rapid rate. Conversely, in response to the detection by control signal decoder 114 of a signal representing a rewind function, controller 128 serves to decrement or "reverse" the dictate pointer at a rapid rate. Thus, the incrementing and decrementing of the dictate pointer is analogous to the movement of a conventional magnetic dictation medium.

A dictator may review the message he has recorded, or is in the process of recording, on disk medium 126. By operating a suitable review or rewind/play control, a rewind control signal is supplied to dictate port 102 and decoded by control signal decoder 114. Controller 128 responds to this rewind control to "reverse" the dictate pointer for as long as the rewind control signal is received. Upon termination of that signal or, alternatively, upon generating a "play" control signal, controller 128 now "advances" the dictate pointer while controlling temporary store 120 to read digitized audio signals from disk medium 126. These digitized audio signals are converted to analog signals by PCM coder/decoder 108 and supplied to the dictate station by dictate port 102. Thus, it is seen that conventional dictate functions and operations are carried out through the dictate channel via dictate port 102. Similar dictate functions are carried out through dictate port 104 and, in the interest of brevity, the foregoing discussion is not repeated here.

A similar operation is carried out when a transcribe station is connected to transcribe port 106. Depending upon the control signals coupled from the transcribe station through the transcribe port to control signal decoder 118, controller 128 controls the reading of PCM-encoded audio signals from disk medium 126 to temporary store 124, and from which those temporarily stored PCM-encoded audio signals are decoded and supplied to the transcribe station through transcribe port 106 as analog audio signals. The controller also generates a transcribe pointer which represents the present location on the disk medium from which the digitized audio signals are being reproduced. As transcription continues, this transcribe pointer is incremented, or "advanced", in a manner similar to the advancing dictate pointer which is effected during a dictate record or dictate play operation.

In response to the detection by control signal decoder 118 of a control signal representing fast-forward movement requested by the dictate station connected to transcribe port 106, controller 128 "advances" the transcribe pointer at a relatively rapid rate. Conversely, in response to the detection by control signal decoder 118 of a control signal representing a rewind function, controller 128 serves to decrement or "reverse" the transcribe pointer at a rapid rate. The transcribe pointer also is controlled to be reversed in response to automatic backspace control 38 (FIG. 1) which, it is recalled, effects what is analogous to a "backspace" movement of a conventional dictation record medium each time that the transcribe station switch, such as the foot pedal, isreleased. Controller 128 also responds to the actuation of RESUME switch 22 and also to BORDER switch 18 to increment or decrement the transcribe pointer accordingly, as has been discussed above.

It will be appreciated that, in view of the high speeds at which PCM-encoded audio signals are recorded on and reproduced from disk medium 126, coupled with the proper storage provided by temporary stores 120, 122 and 124, a transcriptionist having access to transcribe port 106 by means of a suitable transcribe station may play back the very same message which then is being dictated via dictate port 102 or dictate port 104. For example, temporarily stored digitized signals may be read from temporary store 120 and recorded in a suitable sector on disk medium 126 while digitized audio signals which had just been written into temporary store 124 from a different sector on the disk medium is read out, decoded and supplied to the transcriptionist via transcribe port 106. By multiplexing, or time sharing, the read/write operations of disk medium 126 between temporary store 120 and temporary store 124 (as an example), dictation and transcription of the very same message may be carried out concurrently. It is, however, preferable for controller 128 to maintain the transcribe pointer at least a predetermined amount less than the dictate pointer such that, for example, the transcriptionist is inhibited from transcribing the immediately preceding syllable that is recorded by the dictator. In one embodiment, the transcribe pointer is inhibited from being less than about 5–10 seconds (in terms of dictation) from the dictate pointer. That is, the transcribe pointer "trails" the dictate pointer by 5–10 seconds.

However, and as will be described below in conjunction with FIGS. 4 and 5, there is no constraint upon decrementing the dictate pointer such that its value precedes that of the transcribe pointer. That is, the position of the dictate pointer may be "reversed" to a location of a message which has already been passed and transcribed by the transcriptionist. The dictator thus may review that portion of his message which, unknown to him, has already been transcribed. This facility generally has not been possible in conventional analog central dictation systems commercially available heretofore.

In accordance with a desirably advantageous feature of the present invention, not only may the dictator review that portion of his message which has already been transcribed, but he may edit it. That is, the dictator may re-record a portion of his message, or his entire message, even though that portion has been transcribed. Upon detecting this record editing, controller 128 presets the transcribe pointer to be less than the present value of the dictate pointer, that is, less than the representation of the location in disk medium 126 whereat the dictator begins his edit operation. In this manner, temporary store 124 and disk medium 126 are conditioned to read the edited message which then may be decoded and transmitted via transcribe port 106 to the transcribe station. Hence, regardless of the location of the transcribe pointer prior to the initiation of the dictate edit operation, that transcribe pointer is preset such that the transcriptionist, upon next selecting a playback operation, is provided with at least the edit in the message recorded by the dictator. It is appreciated that, even though the transcriptionist already has transcribed a recorded message, edit changes may be made to what has been transcribed; and the transcriptionist promptly is enabled to transcribe those edit changes.

In accordance with yet another feature of this invention, controller 128 is responsive to the operation of selector switch 31 (FIG. 1) to condition transcribe port 106 and the transcribe channel for normal transcribe operations, for a dictate once operation or for a continual dictate operation, as has been mentioned above. If, for example, dictate ports 102 and 104 are seized by respective dictate stations, but there is a relatively heavy demand for dictation, selector switch 31 may be operated to accommodate that demand. As will be described below in conjunction with FIG. 3, if switch 31 is operated to its dictate once position, as may be done by a supervisory operator who perceives a temporary demand for dictation, controller 128 responds thereto to condition PCM coder/decoder 112 to encode audio signals supplied thereto from transcribe port 106 as well as to decode PCM-encoded signals read from temporary store 124. In addition, functions normally associated only with a dictate operation, as represented by suitable control signals received from the dictate station coupled to the transcribe port, are detected and decoded by control signal decoder 118 so as to carry out a dictate operation. Upon release of transcribe port 106 by the dictate station, as when the dictator hangs up, a suitable hang-up signal is detected and decoded by control signal decoder 118. Controller 128 responds to this decoded hang-up signal to disable the encoding capability of PCM coder/decoder 112, thus reverting transcribe port 106 to its transcribe only capability. The transcribe port thus enables only transcribe operations to be carried out therethrough upon its next seizure.

If selector switch 31 is operated to its continual dictate position, as when a supervisory operator perceives a continual demand for dictation, controller 128 enables the encoding function of PCM coder/decoder 112 and permits transcribe port 106 to respond to the next seizure thereof for carrying out a dictate operation through the transcribe channel. This is the same condition as was effected in response to a seizure when the selector switch had been operated to its dictate once position. Now, however, when the transcribe port is released, it remains conditioned to carry out subsequent dictate operations when next seized. Thus, the transcribe port now functions in a manner almost identical to that of dictate ports 102 and 104.

Transcribe Port Control

Figure 3:
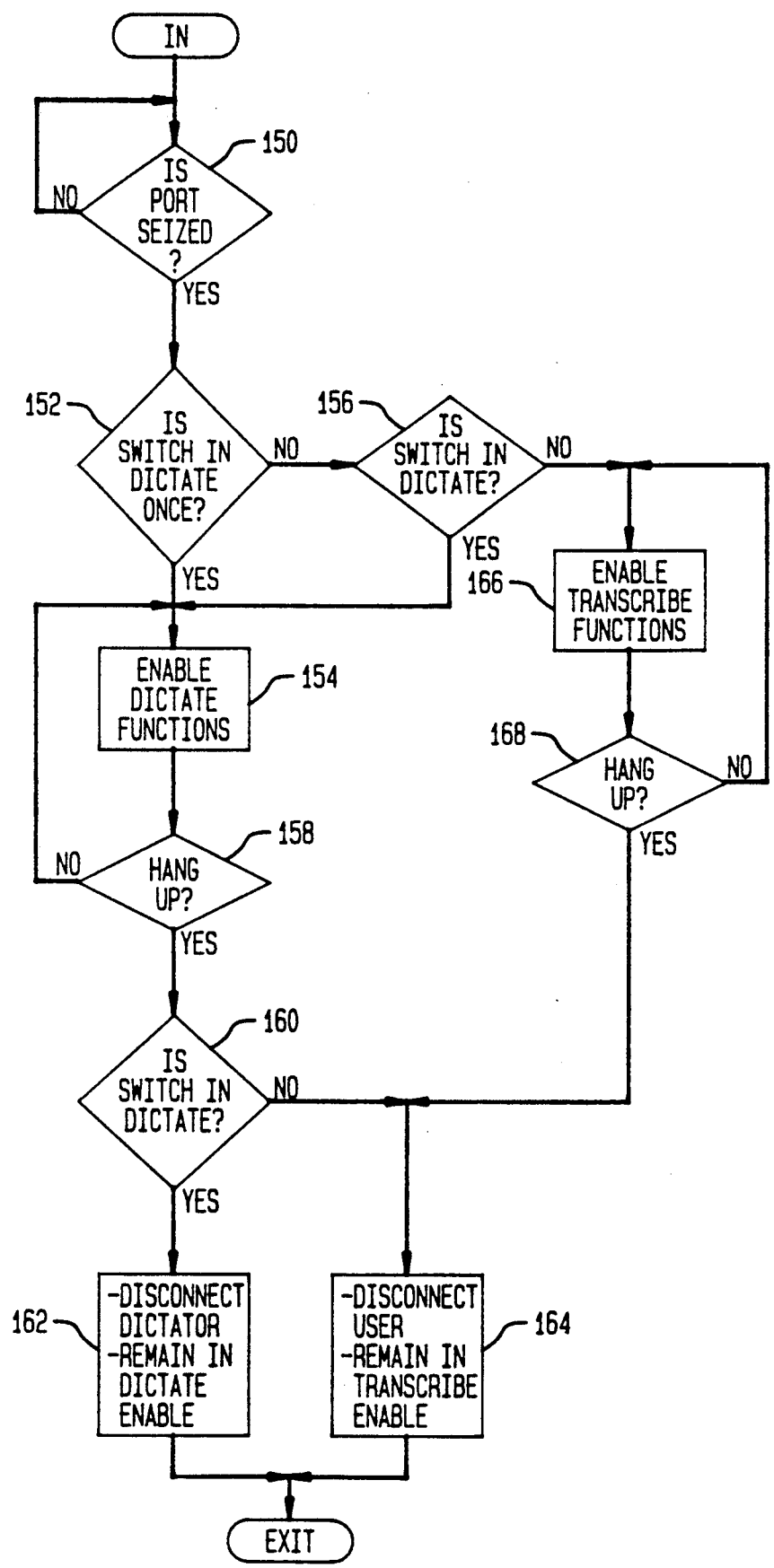
FIG. 3 is a flow chart of microprocessor software used to condition the transcribe port shown in FIG. 2 to carry out transcribe or dictate operations.

Turning now to FIG. 3, that portion of the software by which controller 128 is programmed to control the operation of transcribe port 106 to carry out transcribe or dictate functions now is represented by the illustrated flow chart. More particularly, this flow chart represents the subroutine of controller 128 for controlling the functional operation of transcribe port 106 and the transcribe channel in response to the operation of selector switch 31.

As shown in FIG. 3, the subroutine initially inquires, at inquiry 150, if transcribe port 106 has been seized. If not, the subroutine merely cycles through this inquiry; although it will be appreciated that controller 128 may carry out other operations and periodically return to inquiry 150.

If this inquiry is answered in the affirmative, the subroutine advances to inquire, at 152, if switch 31 is in its dictate once position If so, instruction 154 is carried out to enable transcribe port 106 and the transcribe channel to perform dictate functions. Thus, the transcribe pointer, which now functions as a dictate pointer, is advanced or reversed, audio signals are received, encoded and recorded, and other conventional dictate functions are executed.

The subroutine next inquires, at 158, if the transcribe port has been released. That is, inquiry 158 determines if the dictator has hung up. If this inquiry is answered in the negative, the subroutine cycles through the loop comprised of instruction 154 and inquiry 158, thereby enabling dictate functions to continue through transcribe port 106. However, if inquiry 158 is answered in the affirmative, inquiry 160 is made to determine if switch 31 is in its continual dictate position. It has been assumed herein that switch 31 is in its dictate once position and, therefore, inquiry 160 is answered in the negative. Consequently, the subroutine advances to instruction 164, whereupon the user (which, in the present case, is a dictator) is disconnected. That is, transcribe port 106 is released, and the transcribe port and transcribe channel now revert to their transcribe enable condition. Thus, when the transcribe port next is seized, it enables transcribe functions to be carried out therethrough. It is appreciated, then, that the transcribe port and transcribe channel are enabled, or conditioned, for subsequent transcribe operations.

Let it be assumed that inquiry 152 is answered in the negative. Then, the subroutine advances to inquiry 156 to determine if switch 31 is in its transcribe only position or in its continual dictate position. If the latter, inquiry 156 is answered in the affirmative; and the subroutine advances to instruction 154, described above. Thus, transcribe port 106 and the transcribe channel are enabled to carry out the aforementioned dictate functions until the transcribe port is released. At that time, inquiry 158 is answered in the affirmative and inquiry 160 is made.

If switch 31 remains in its continual dictate position, inquiry 160 is answered in the affirmative and, therefore, the subroutine advances to instruction 162. As indicated, transcribe port 106 is released, that is, the dictator is disconnected therefrom, and the transcribe port and transcribe channel remain in their dictate enable conditions. As a consequence, a dictate operation may be carried out through the transcribe port and transcribe channel at the next seizure of the transcribe port. Therefore, even though one dictator may hang up, another may seize transcribe port 106 and carry out full and complete dictate operations for the recording of digitized audio messages on disk medium 126.

Let it now be assumed that inquiries 152 and 156 both are answered in the negative. This means that switch 31 is operated to its transcribe only position. The subroutine then advances to instruction 166 by which transcribe port 106 and the transcribe channel are enabled to carry out transcribe functions. As mentioned above, the encoding function of PCM coder/decoder 112 is disabled and encoded signals are not written into temporary store 124 from the PCM coder/decoder or read from the temporary store to disk medium 126.

Inquiry 168 is made to determine if transcribe port 106 has been released. That is, this inquiry determines if the transcriptionist has hung up. If not, the subroutine cycles through the loop comprised of instruction 166 and inquiry 168 until the inquiry is answered in the affirmative. At that time, instruction 164 is carried out, whereupon transcribe port 106 is released and the transcribe port and transcribe channel remain in their transcribe enable condition. This means that, upon the next seizure of the transcribe port, a transcribe operation may be carried out therethrough.

It will be appreciated that if selector switch 31 is operated to its continual dictate position, transcribe port 106 and the transcribe channel are conditioned to carry out dictation functions. If, during a dictation operation, switch 31 is changed over to its dictate once or transcribe positions, inquiry 160 is answered in the negative once the transcribe port is released. Thus, even during a dictate or transcribe operation, suitable actuation of selector switch 31 conditions the transcribe port and transcribe channel for subsequent transcribe or dictate operations once the transcribe port has been released.

Although only one transcribe port and transcribe channel are illustrated in FIG. 2, it will be appreciated that plural transcribe ports and channels may be provided for temporary use as dictate channels, thereby accommodating heavy demand and traffic for dictation.

Editing Transcribed Messages

Figure 4:
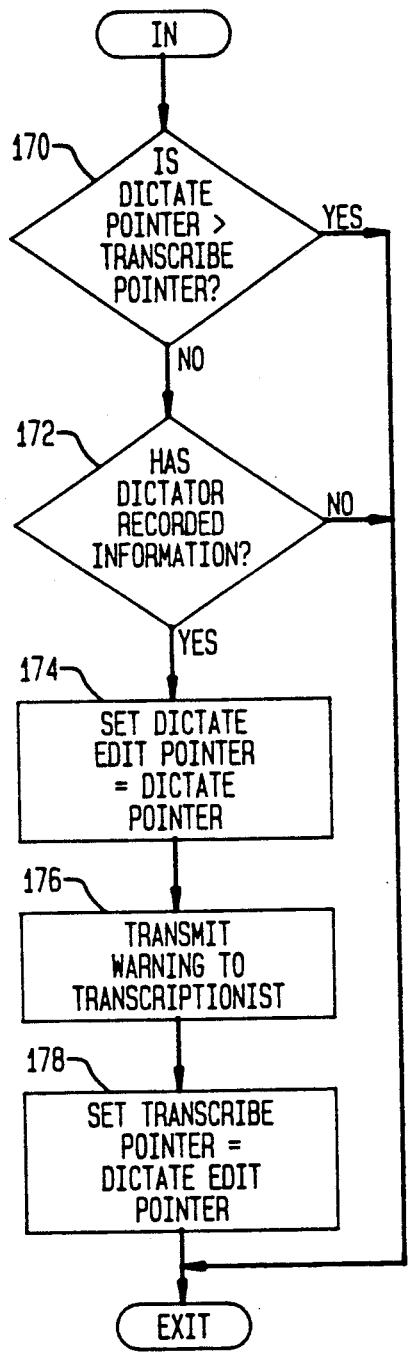
FIG. 4 is a flow chart of microprocessor software used to control a transcribe/playback operation when a dictator edits a previously transcribed message.

The software subroutine of controller 128 by which a transcriptionist automatically and promptly may transcribe a recorded edit change in that portion of the message which the transcriptionist already has transcribed is illustrated in the flow chart of FIG. 4. As has been described above, the controller generates dictate and transcribe pointers representing the present position in disk medium 126 at which a dictated message is being recorded, or written, and at which a previously dictated message is being reproduced, or read, for transcription. Inquiry 170 first is made to determine if the value of the dictate pointer is greater than that of the transcribe pointer. That is, inquiry 170 determines if the dictator has reviewed that portion of the message which the transcriptionist already has transcribed. If this inquiry is answered in the affirmative, that is, if the dictator has not "reversed" to a position that precedes the transcribe pointer position, the controller exits the illustrated subroutine.

However, if inquiry 170 is answered in the negative, that is, if the dictate pointer position precedes the transcribe pointer position (i.e. the dictator has reversed to a position which precedes the present position of the transcriptionist), inquiry 172 is made. This inquiry determines if the dictator has recorded information at this reversed position. If not, the controller merely exits the illustrated subroutine.

However, if inquiry 172 is answered in the affirmative, that is, if the dictator records an edit in the message then being transcribed by the transcriptionist, the subroutine advances to instruction 174. As illustrated, a dictate edit pointer is set equal to the present value of the dictate pointer, thus noting the location in the message at which the edit operation is being carried out. Thereafter, instruction 176 is executed to transmit a warning indication to the transcriptionist. Preferably, this warning indication is in the form of an audible signal which apprises the transcriptionist of the fact that the dictator has recorded a change, or edit, in that portion of the message which the transcriptionist already has transcribed. Instruction 178 next is carried out by which the value of the transcribe pointer is made equal to that of the dictate edit pointer. Hence, the present position of the transcribe pointer is preset such that the recorded edit may be played back when the transcriptionist next operates a "play" switch (such as a foot pedal, or the like).

It is appreciated that instruction 178 conditions the transcribe channel and the transcribe station connected to transcribe port 106 (FIG. 2) to play back automatically at least the edit in the message which has been recorded by the dictator. However, if the dictator merely reviews that portion of the message which has already been transcribed but does not effect a dictate operation, that is, if the dictator does not operate a "dictate" or "record" switch at the dictate station, the transcribe pointer is not preset and merely is incremented as transcription proceeds, or is advanced or reversed as the transcriptionist effects a "fast-forward" or "reverse" operation.

Figure 5:
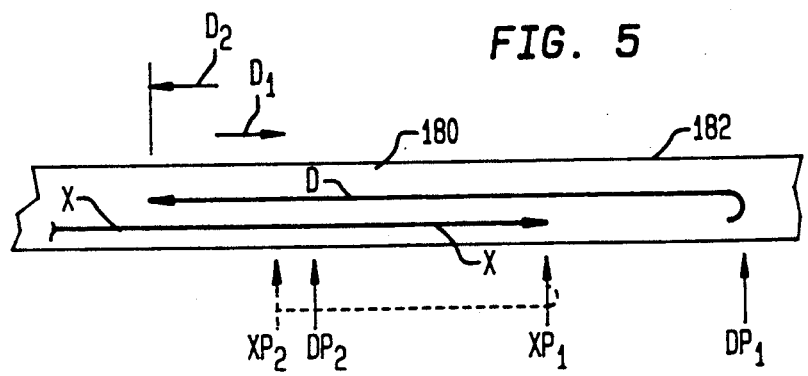
FIG. 5 is a schematic representation which is helpful in understanding the operation controlled by the flow chart of FIG. 4.

The foregoing operation is schematically represented in FIG. 5 in which a message recorded on disk medium 126 is analogized as an audio message 180 recorded on a conventional record medium 182, such as a magnetic tape. The dictate pointer is represented as DP and the transcribe pointer is represented is XP. Let it be assumed that the dictator has reached the location represented as $DP_1$ while the transcriptionist has reached the location represented as $XP_1$. If the dictator now wishes to review the message which he has dictated, an operation similar to a "rewind" operation is carried out, as represented by reverse movement D. At this time, the transcriptionist nevertheless may continue to transcribe message 180, as represented by forward transcribe movement X.

As indicated by arrows $D_1$ and $D_2$, the dictator may play back message 180, indicated by arrow $D_1$, or may continue to "rewind", represented by arrow $D_2$. Let it be assumed that the dictator is at the location represented by dictate pointer $DP_2$ and that the dictator now actuates a "dictate" or "record" switch. In response thereto, the transcribe pointer is preset to a location represented as transcribe pointer $XP_2$ which, in the embodiment described herein, slightly precedes the present position of dictate pointer $DP_2$ whereat the edit change to message 180 commences. Then, the transcriptionist may increment or decrement transcribe pointer $XP_2$ so as to re-transcribe message 180, including the edits recorded therein, or the transcriptionist may review other portions of the message, such as those portions which precede the location of transcribe pointer $XP_2$, or the transcriptionist may return quickly to the farthest advance transcribe position previously attained, as represented by transcribe pointer $XP_1$.

While the present invention has been particularly shown and described with reference to preferred embodiments, it will be readily appreciated by those of ordinary skill in the art that various changes and modifications may be made without departing from the spirit and scope of the invention. It is intended that the appended claims be interpreted as covering the embodiments specifically described herein, the aforementioned changes and modifications, and all equivalents thereto.

What is claimed is:

1. A digital dictation system having a central store accessible concurrently by at least one dictator to record and/or receive messages at a changing dictator position in said store and by a transcriptionist to transcribe messages from a changing transcriptionist position in said store, said system comprising.

dictate review means for enabling a dictator to review a message then being transcribed by said transcriptionist;

record means operable by said dictator to record information including an edit in the message then being transcribed by said transcriptionist; and transcribe playback means conditioned automatically to play back to said transcriptionist at least the edit in the message recorded by said dictator if said edit is made at a portion of the message which has been transcribed by said transcriptionist.

2. The system of claim 1 wherein said transcribe playback means includes position detect means for detecting when the dictator position precedes the transcriptionist position in the message then being transcribed to provide detect signal; record sense means for sensing when said dictator records an edit in the message then being transcribed to provide a record sense signal; and conditioning means responsive to said record sense signal and said detect signal to condition said transcribe playback means to playback automatically at least said edit.

3. The system of claim 2 wherein said transcribe playback means includes disable means for disabling said conditioning means while the dictator merely reviews the message then being transcribed.

4. The system of claim 2 wherein said transcribe playback means includes disable means for disabling said conditioning means when said dictator records information if the dictator position in said store is effectively greater than the transcriptionist position.

5. The system of claim 1 further comprising dictate pointer means for generating a digital dictate pointer signal representing the present dictator position in said store; transcribe pointer means for generating a digital transcribe pointer signal representing the present transcriptionist position in said store; and relative position detecting means responsive to said dictate and transcribe pointer means for determining when said dictate pointer signal precedes said transcribe pointer signal.

6. The system of claim 5 wherein said transcribe playback means includes record sense means for sensing when said record means is operated by said dictator; and transcribe pointer control means for adjusting said transcribe pointer signal so as to precede said dictate pointer signal if: (a) said relative position detecting means determines that said dictate pointer signal precedes said transcribe pointer signal, while (b) said record sense means senses the operation of said record means.

7. The system of claim 6 further comprising playback control means operable by a transcriptionist to play back messages from locations in said store determined by said transcribe pointer signal; whereby edits recorded at a dictator position which precede a present transcriptionist position in said store are played back in response to the operation of said playback control means.

8. The system of claim 6 wherein said transcribe playback means includes warning means for providing warning indications to a transcriptionist when said transcribe pointer signal is adjusted to precede said dictate pointer signal.

9. The system of claim 8 wherein said warning means includes audible signal generating means for generating audible warning signals.

10. A digital dictation system having a central store accessible by at least one dictator to record and/or review messages in said store and by a transcriptionist to transcribe messages from said store, said system comprising:

at least one dictate port for connection to a dictate station and through which dictation operations are carried out;

a transcribe port normally adapted to be connected to a transcribe station and through which transcribe operations normally are carried out; and selector means manually operable to a first state for conditioning said transcribe port to be connected to a transcribe station and carry out transcribe operations therethrough, said selector means being manually operable to a second state for conditioning said transcribe port to be connected to a dictate station and to respond to a seizure of said transcribe port by the dictate station connected thereto to carry out dictate operations therethrough.

11. The system of claim 10 wherein said selector means includes means responsive to release of said transcribe port by said dictate station when said selector means is in said second state for conditioning said transcribe port to carry out transcribe operations thereafter.

12. The system of claim 11 wherein said selector means is additionally manually operable to a third state for conditioning said transcribe port to respond to a seizure thereof by a dictate station connected thereto to carry out dictate operations therethrough and to remain in said last-mentioned condition even after said dictate station releases said transcribe port; whereby subsequent dictate operations are carried out when said transcribe port is next seized by a dictate station.

13. The system of claim 11 wherein said selector means further includes means for sensing if the state of said selector means is changed from said third state during a dictate operation to condition said transcribe port to carry out transcribe operations after said dictate station releases said transcribe port.

14. The system of claim 13 wherein said selector means comprises a manually operable three-position switch and a microprocessor responsive to the position of said switch to dispose said transcribe port in a transcribe condition, a dictate once condition and a continual dictate condition, respectively.

* * * * *